(12) United States Patent
Ravichandran

(10) Patent No.: US 10,587,753 B1
(45) Date of Patent: Mar. 10, 2020

(54) PRESENTING CONTENT DURING VIDEO CALL HOLD EVENTS

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/282,261

(22) Filed: Feb. 21, 2019

(51) Int. Cl.
*H04M 3/428* (2006.01)
*H04L 29/06* (2006.01)
*H04N 21/45* (2011.01)
*H04N 7/14* (2006.01)

(52) U.S. Cl.
CPC ...... *H04M 3/4285* (2013.01); *H04L 65/1006* (2013.01); *H04N 7/147* (2013.01); *H04N 21/4524* (2013.01)

(58) Field of Classification Search
CPC ...... H04N 7/147; H04N 21/4524; H04W 4/16
See application file for complete search history.

(56) References Cited

U.S. PATENT DOCUMENTS

| | | | | |
|---|---|---|---|---|
| 7,417,988 B1* | 8/2008 | Tripathi | ............ | H04M 3/42212 370/260 |
| 2002/0191775 A1* | 12/2002 | Boies | .................. | H04M 3/4285 379/266.01 |
| 2006/0253698 A1* | 11/2006 | Mate | ................. | H04L 29/06027 713/151 |
| 2007/0003043 A1* | 1/2007 | Kapur | ................. | H04M 3/4285 379/211.02 |
| 2011/0051908 A1* | 3/2011 | Garner | ................... | G06Q 30/02 379/88.04 |
| 2011/0129072 A1* | 6/2011 | Knapp | ................ | H04M 3/4285 379/88.13 |
| 2011/0270661 A1* | 11/2011 | Heiser, II | ............... | G06Q 30/02 705/14.25 |
| 2011/0299675 A1* | 12/2011 | Stucker | ................. | H04M 3/428 379/207.02 |
| 2014/0280720 A1* | 9/2014 | Bischoff | ............... | G06F 9/5072 709/217 |
| 2016/0191702 A1* | 6/2016 | Gabbai | .............. | H04M 3/4286 379/266.06 |

* cited by examiner

*Primary Examiner* — Ernest G Tacsik
(74) *Attorney, Agent, or Firm* — Perkins Coie LLP

(57) ABSTRACT

Systems and methods are described herein for handling video calls placed on hold or otherwise parked by one or more parties within the video call. The systems and methods can determine a video call has been placed on hold (or otherwise set to be parked), and transfer the video call to a call park server (CPS). The systems and methods can then access a content server, retrieve one or more content items (e.g., video clips, interactive content or advertisements, and so on), and present the content items within the on hold video call.

20 Claims, 4 Drawing Sheets

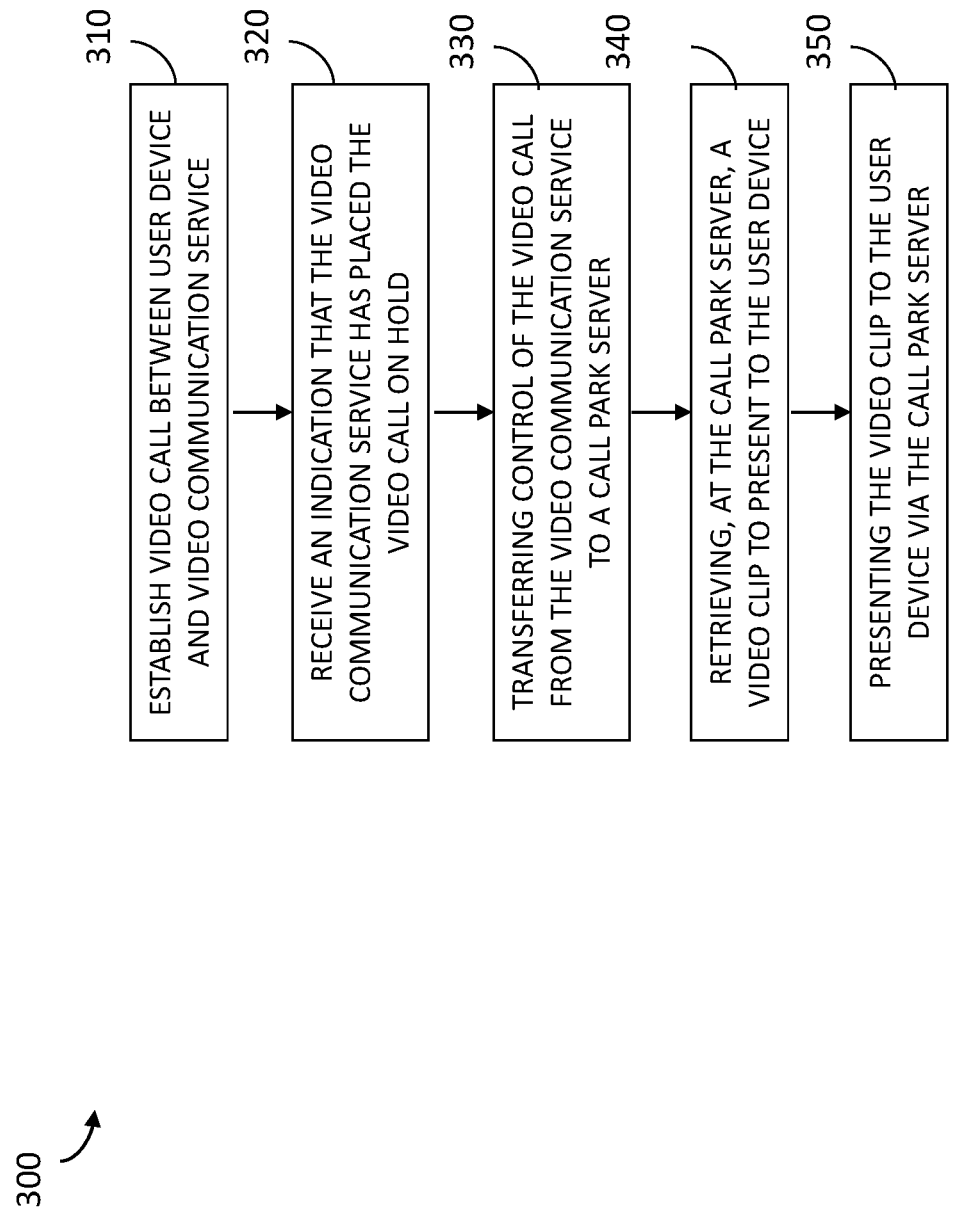

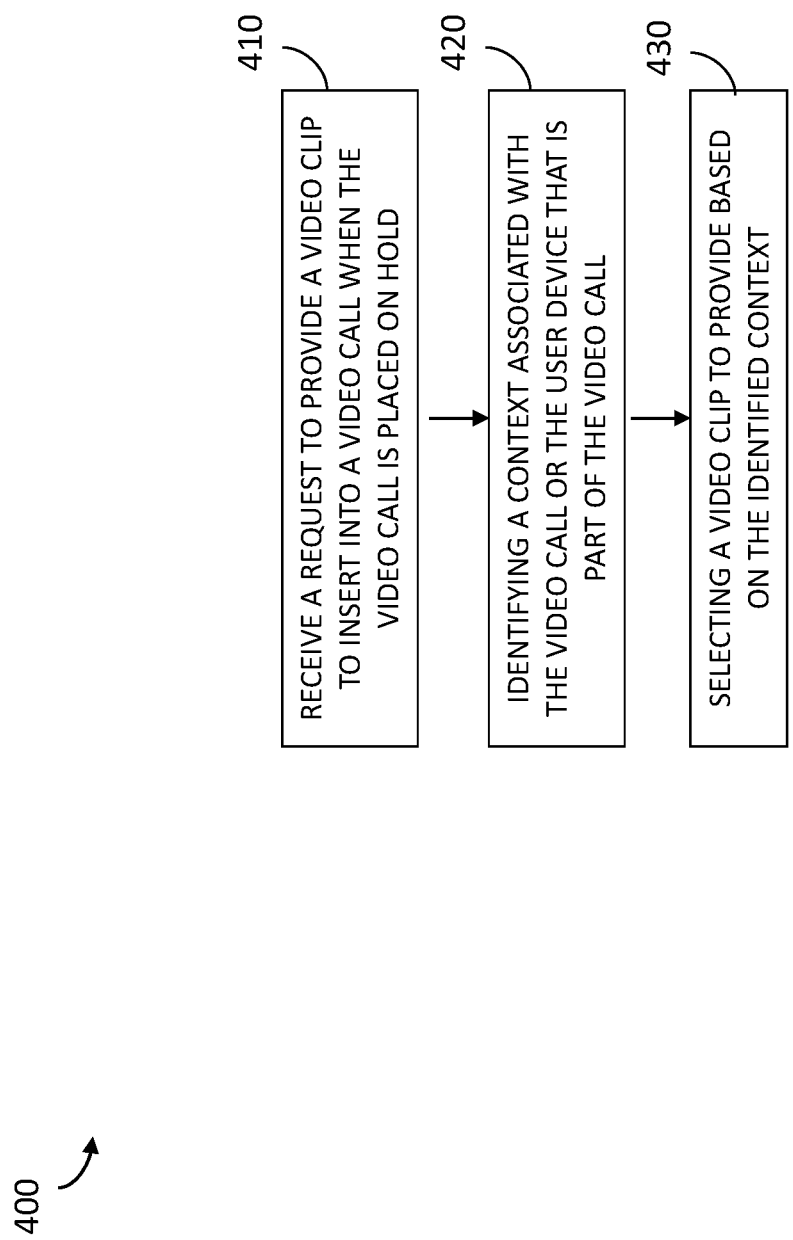

PRESENTING CONTENT DURING VIDEO CALL HOLD EVENTS

BACKGROUND

Many companies and other entities have customer service departments that handle customer complaints, inquiries, questions, requests, and other communications. Naturally, as communication technologies have evolved, so have the mechanisms via which customer service representatives interact with customers.

For example, smart phones and other mobile devices have become ubiquitous, and customer service centers facilitate communications with customers via the various communications channels provided by the mobile devices. To that end, in addition to handling customer interactions via conventional voice calls, customer service centers also interact with customers over text messaging channels, instant messaging channels (e.g., chatbots), web interfaces, video calling and chats, and other communications channels enabled by smart phones, smart home devices, and other similar devices.

However, as customer service centers (and other entities or companies) interact with customers and other users via various communication channels, various issues and drawbacks may arise as their use expands. Therefore, technologies that improve or enhance their use and utilization would greatly assist in the adoption of these communication channels.

BRIEF DESCRIPTION OF THE DRAWINGS

Embodiments of the present technology will be described and explained through the use of the accompanying drawings.

FIG. 3 is a flow diagram illustrating a method for presenting content to a user device when a video call is placed on hold.

FIG. 4 is a flow diagram illustrating a method for selecting content to be presented during a video call hold event.

Figure 1:
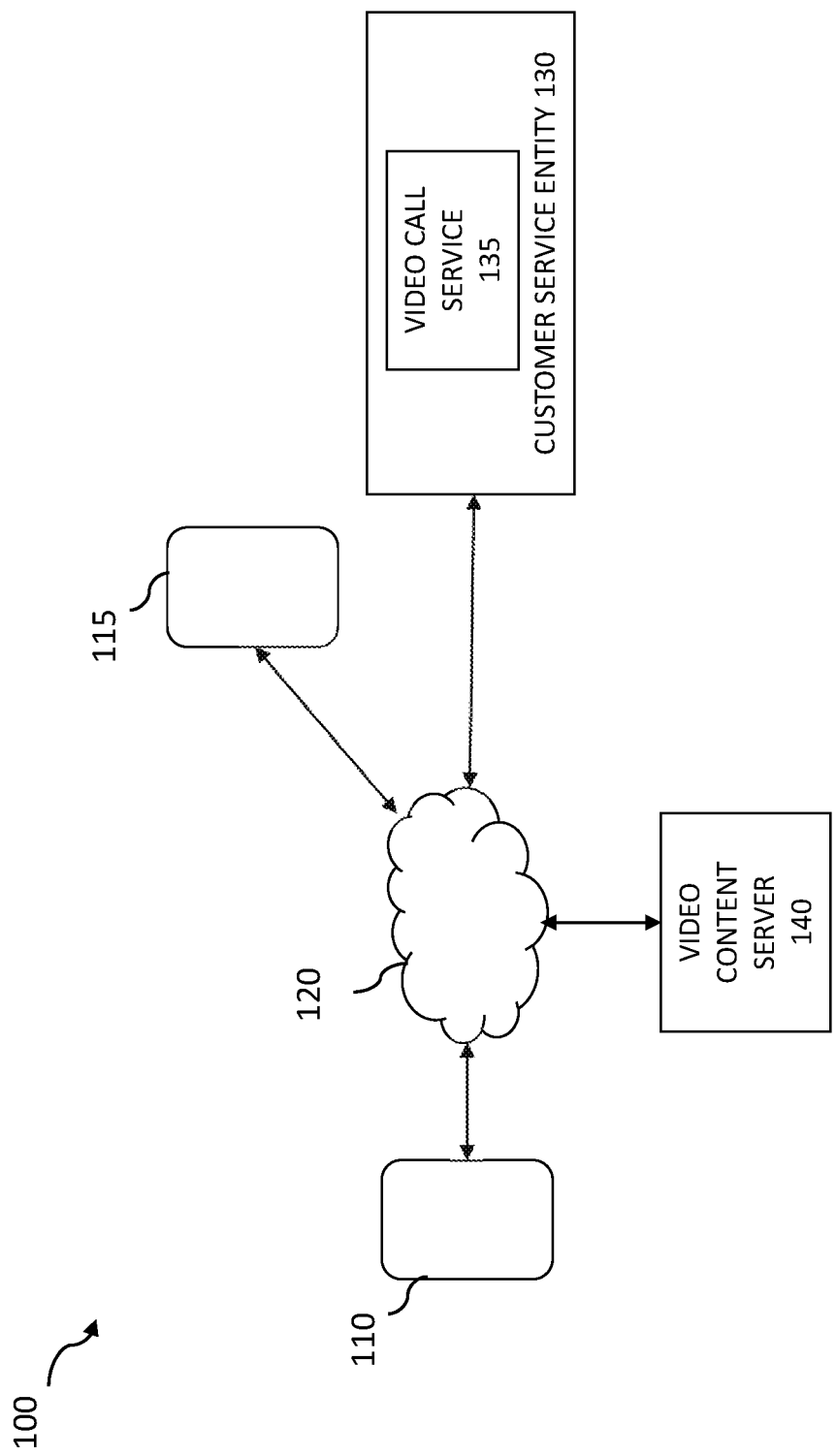
FIG. 1 is a block diagram illustrating a suitable computing environment for presenting content within hold events during video calls.

In the drawings, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for handling video calls placed on hold or otherwise parked by one or more parties within/during the video call. The systems and methods (collectively, "systems") can determine a video call has been placed on hold (or otherwise set to be parked), and transfer the video call to a call park server (CPS). The systems can then access a content server, retrieve one or more content items (e.g., video clips, interactive content or advertisements, and so on), and present the content items within the on hold video call.

Further, the systems can consider a context associated with a video call when selecting the content items to present when the call is on hold, to determine when to end a playing content item (and return control of a video call), and so on. Thus, in some implementations, the systems select and present content items to users (via their mobile devices) based on a variety of dynamically determined conditions or contexts associated with a video call.

In doing so, the systems improve and enhance user experiences with video calling, such as video calling with customer service centers associated with companies and other entities. For example, by identifying a context applied to a video call, the systems insert content items when video calls are placed on hold in a seamless fashion, avoiding disruptions to the video calls (or the presented content items), among other benefits. Further, the systems, in tailoring what content is presented during a hold placed to a video call, facilitates the presentation of content that is of interest to a user, enhancing the user's experience and interaction with the called entity, among other benefits.

In some embodiments, the systems present content to a user device during a video call, by establishing a video call between a user device (e.g., a mobile phone) and a video communication service, where the video communication service can be part of a customer service center that handles customer service inquiries from customers of an entity. The systems receive an indication that the video call has been placed on hold by the video communication service, and transfer control of the call from the service to a call park server. Then, the call park server retrieves a video clip (or other content item) to present to the user via the phone while the video is on hold, and presents the video, via the call park server, while the server controls the call.

In some embodiments, a system that provides a session internet protocol (SIP) service for handling video calls managed by a telecommunications network includes a call park module that manages a video call established between first and second devices. The call park module transfers from the second device to a call park server when the video call is placed on hold by the second device. The system includes a content selection module that selects a content item to present to the first device during the hold placed on the video call by the second device (where the content item is presented to the first device via the call park server).

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Network Environments

As described herein, in some embodiments, the systems and methods facilitate the presentation of video clips and other content items to users during video calls, when the video calls are placed on hold or otherwise parked during a call. FIG. 1 is a block diagram illustrating a suitable computing environment 100 for presenting content within hold events during video calls.

The computing environment 100 includes a user device 110 communicating with other user devices 115 and/or with a customer service entity 130 over a network 120, such as a telecommunications network. For example, the user device 110 can communicate with the other user devices 115 and/or the customer service entity 130 via voice communication channels, messaging channels (e.g., via text, short message service (SMS), multimedia message service (MMS), instant messaging, and so on), video communications channels (e.g., video over IP) and videotelephony, and other data channels (e.g. voice over IP (VoIP).

For example, the user device 110 can be a mobile device, such as a smart phone, laptop, tablet, and so on, a smart home device, or other computing or smart devices that include functionality capable of presenting video-based interactive communications to users associated with the devices. Thus, the user device 110 (and device 115) can include various different types of clients or mobile applications that provide for video-based communications, including clients native to the devices (e.g., the text message or video call client of a smart phone), mobile applications downloaded to the devices (e.g., messaging applications, chat applications, instant message applications, social media or networking applications, enterprise applications, videotelephony applications, and so on), and others.

Further, the network carrier providing the communications network 120 can provide a client or application for the user device 110. The carrier provided client or application, in some cases, enables a user or subscriber to communicate via a single phone number across multiple mobile devices. An example application providing such functionality can include the "Digits"™ application or service, provided by T-Mobile.

Similarly, the customer service entity 130 can include a video call service 135 that enables representatives at the entity 130 to participate in video-based communications with the user device 110 (and other devices). The video call service 135 can include some or all of the functionality described herein with respect to providing video-based communications, such as video chat functionality, video calling functionality, and so on. The video call service 135, therefore, can provide application- or browser-based video chat and calling access to the user device 110.

In some embodiments, the network 120 facilitates video-based communications between the user device 110 and another user device (device 115) or the video call service 135 of the customer service entity 130 via a Session Initiation Protocol (SIP). SIP is a signaling protocol that initiates, manages, and ends real-time, two-way, communication sessions between devices, such as video, messaging, voice, and other IP-based communication sessions.

During a video call established between the user device 110 and the video call service 135 of the customer service entity 130, the video call service 135 can place the video call on hold, or otherwise park the call (e.g., to refer or transfer the call to another person or department). For example, a representative can place the video call on hold to attend to another call, to retrieve information for the user, and so on. Instead of showing an "on hold" graphic, or playing music (which is common to voice calls placed on hold), the systems and methods retrieve or otherwise access a content item (e.g., a video clip or advertisement) from a video content server 140, and present the retrieved content item to the user device 110 during the hold placed on the video call.

Upon resuming the video call (e.g., taking the call off of hold), the video call service 135 ends presentation of the content item, and resumes communicating directly with the user device 110. Further details regarding the call flows utilized when managing the video call and retrieving content items are described in more detail herein.

Thus, the systems and methods provide customers, subscribers, and other users associated with an entity with an improved and enhanced video calling customer service experience, because video calls that are parked (e.g., placed on hold) can still present users with content that is entertaining and/or of interest to the users, without detracting from the experience provided to the users during the hold period, among other benefits.

FIG. 1 and the discussion herein provide a brief, general description of a suitable computing environment in which presenting video content during video calls placed on hold, and associate components, can be supported and implemented. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system can reside on a server computer, while corresponding portions can reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

In some embodiments, the devices can include network communication components that enable the devices to communicate with remote servers or other portable electronic devices by transmitting and receiving wireless signals using a licensed, semi-licensed, or unlicensed spectrum over communications networks. In some cases, the telecommunication network can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other 3GPP or non-3GPP communications networks.

Examples of Presenting Video Content During Hold Events in Video Calls

As described herein, in some embodiments, the systems and methods facilitate the insertion of video and other content items (e.g., video clips, multimedia advertisements, interactive content, and so on) into video calls when the video calls are placed on hold or parked during a real-time communication session between devices or computing systems (e.g., between the user device 110 and the video call service 135 of the customer service entity 130).

Figure 2:
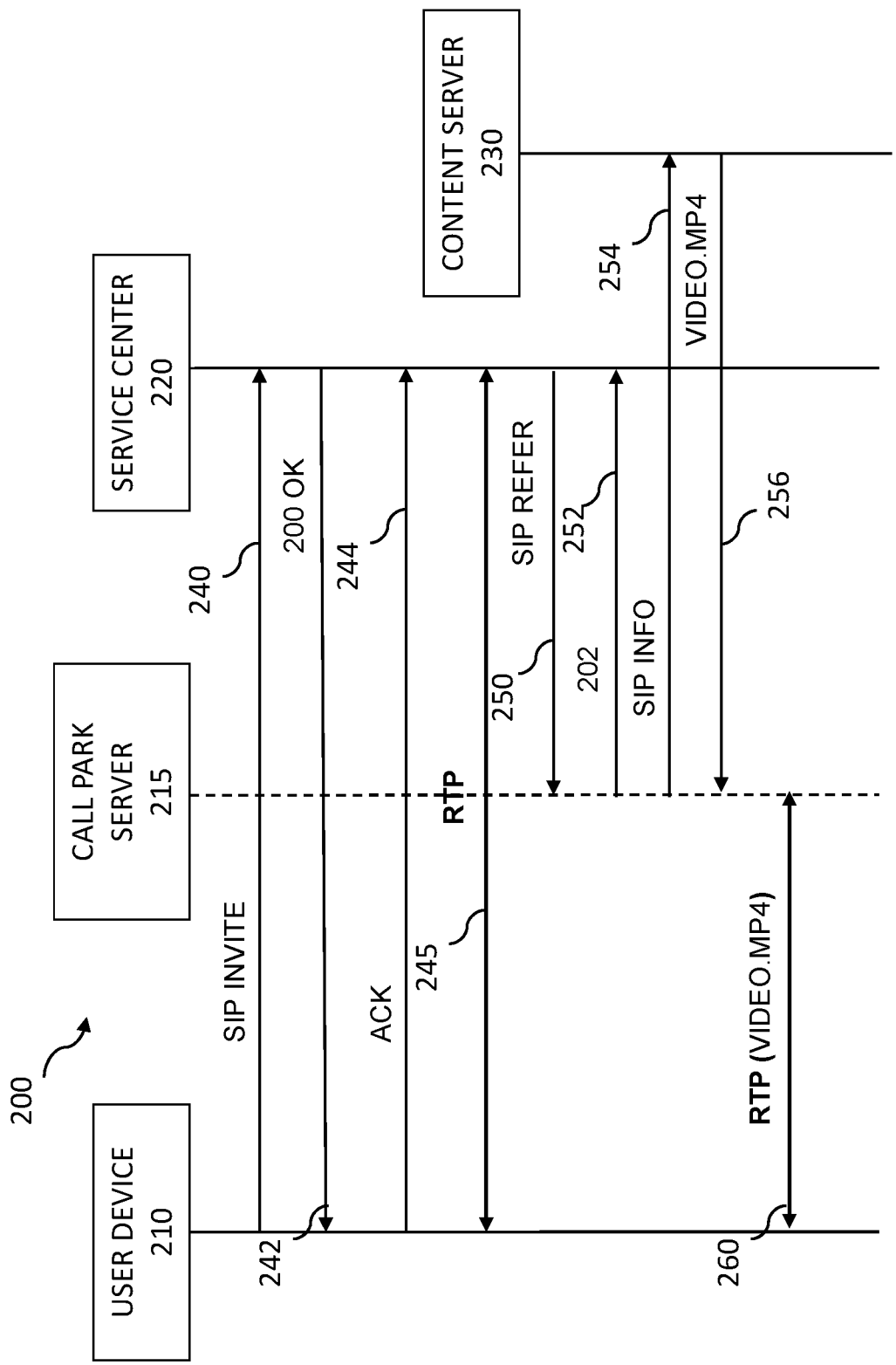
FIG. 2 is a flow diagram illustrating a sequence of call flows between a user device, a customer service center, and a call park server.

FIG. 2 is a flow diagram illustrating a sequence of call flows 200 between a user device 210, a customer service center 220, and a call park server 215. The depicted sequence of call flows 200 does not depict all call flows used when managing a video call between entities, but does depict at least some of the call flows associated with establishing a video call or chat, placing a video call on hold, retrieving content items, and presenting the retrieved content items during a video call session.

The sequence of call flows depicted in FIG. 2 can be based, in some embodiments, on call flows established for audio or voice calls, including handling of call flows when voice calls are placed on hold or otherwise parked during a session. For example, the systems and methods can leverage and/or utilize various specifications, such as RFC (Request for Comments) 3261 (providing basic SIP comments and call flows), RFCs 5359 and 7088 (providing call flows and implementation details for playing music when voice calls are on hold), RFC 5705 (providing a media server, such as content server 140, with information when selecting content items), and/or RFC 5491 (Presence Information Data Format Location Object (PIDF-LO) information).

To initiate or establish a video call or video chat over the SIP protocol, the user device 210 sends a SIP INVITE message 240 to the service center 220, such as to the video call service 135 of the customer service entity 130. The SIP INVITE message 240 can include information that identifies a device type for the user device 110, information about a user associated with the user device 110, information identifying a location (e.g., geographical location, physical structure, and so on), for the user device 110, and so on.

For example, the SIP INVITE message 240 (or a similar SIP REGISTER message) can include PIDF-LO information for the user device 110 (or can be included in multiple SIP INVITE or REGISTER messages. Example PIDF-LO information (identifying a location of a user device) can be provided as follows:

```
<presence xmlns="urn:ietf:params:xml:ns:pidf"
    xmlns:dm="urn:ietf:params:xml:ns:pidf:data-model"
    xmlns:gp="urn:ietf:params:xml:ns:pidf:geopriv10"
    xmlns:cl="urn:ietf:params:xml:ns:pidf:geopriv10:civicAddr"
    xmlns:gml="http://www.opengis.net/gml"
    entity="pres:point2d@example.com">
  <dm:device id="point2d">
    <gp:geopriv>
      <gp:location-info>
        <gml:Point srsName="urn:ogc:def:crs:EPSG::4326">
          <gml:pos>-34.407 150.883</gml:pos>
        </gml:Point>
      </gp:location-info>
      <gp:usage-rules/>
      <gp:method>Wiremap</gp:method>
    </gp:geopriv>
    <dm:deviceID>mac:1234567890ab</dm:deviceID>
    <dm:timestamp>2007-06-22T20:57:29Z</dm:timestamp>
  </dm:device>
</presence>
```

As another example, the SIP INVITE message 240 can provide device type information (e.g., OS information, model information, application version information, and so on), which can be used when selecting video content to present during a hold placed to the video call. For example, the SIP INVITE message 240 can include the following example information:

"T-Mobile UCC v4.0.0 2018-02-16 iOS 11.2.1 iPhone 7s –ussd"

Upon receipt of the SIP INVITE message 240, the service center 220 returns a SIP 200 OK message 242, which includes response code "200," indicating the SIP INVITE message 240 was successful. The user device 210 then returns a SIP ACK message 244 to acknowledge and confirm that the user device 210 has received the OK message 242. A real-time transport protocol (RTP) session 245 is thus established between the user device 210 and the service center 220. During the RTP session 245, the user device 210 and the service center 220 interact via video-based communications, such as a video call or video chat session.

At some point during the video call, the service center 220 places the video call on hold (or otherwise parks the video call). To do so, the center 220 sends a SIP REFER message 250 to the call park server (CPS) 215. The SIP REFER message 250 requests that the call park server 215 issue a request to transfer the video call (or, control of the video call) from the service center 220 to the CPS 215.

The CPS 215 sends a SIP 202 message 252 to the service center 220, indicating, with the code "202," that the CPS 215 has received the SIP REFER message 220, but has not yet completed processing the request. Then, the CPS 215 sends a SIP INFO message 254 to a content server 230, which stores and provides content items for presentation within video calls. The SIP INFO message 254 can be configured to include information requesting retrieval of one or more content items, as well as information that identifies a context applied to the video call (e.g., such as the various contexts described herein). An example SIP INFO message 254 can be provided as follows:

INFO sip:msml@10.178.8.69:5060 SIP/2.0
Via: SIP/2.0/UDP 10.169.50.244:5061;rportbranch=z9hG-4bKmavodi-1-bc-821-0-ffffc03f-3616382204-31527
Max-Forwards: 70

Allow: INVITE
Allow: BYE
Allow: CANCEL
Allow: ACK
Allow: SUBSCRIBE
Allow: NOTIFY
Allow: PUBLISH
Allow: MESSAGE
Allow: REFER
Allow: REGISTER
Allow: UPDATE
From: sip:12064899309@msg.lab.t-mobile.comaag=mavo-di-1-bc-821-0-ffffc03f-_000050AFB514-7b27-e951a700-5e169-538fcab7-32019
To: sip:msml@10.178.8.69:5060;tag=10.178.8.695060+1+3ef0002+9eeb56d3
Call-ID: 000050AFB514-7b27-e951a700-5e168-538fcab7-31fe8
CSeq: 4 INFO
Contact: sip:mavodi-1-bc-821-0-ffffc03f-@10.169.50.244:5061
Content-Type: application/msml+xml
Content-Length: 746

The content server 230, upon receiving the SIP INFO message 254, can return a SIP INFO message 256 that identifies one or more content items that satisfy the request (and any context parameters or conditions associated the video call). The return SIP INFO message 256 can identify one or more video files (e.g., .mp4 files) or other interactive content (e.g., IP addresses for streaming content, such as interactive content streamed to the user device 210). An example return SIP INFO message 256 is provided as follows:

<?xml version="1.0" encoding="UTF-8"?>
<msml xmlns:cvd="http://convedia.com/ext"
xmlns:xsi="http://www.w3.org/2001/XMLSchema-instance" version="1.1">
<dialogstart type="application/moml+xml" target="conn:10.178.8.695060+1+3ef0002+9eeb56d3"
name="playAnnouncement" mark="1">
<play id="annc" barge="true" cleardb="true">
<video uri="clip1.mp4"/>
<playexit>
<exit namelist="play.amt play.end"/>
</playexit>
</play>
</dialogstart>
</msml>INFO sip:msml@10.178.8.69:5060 SIP/2.0

The call park server 215 establishes an RTP session 260 with the user device 210, and presents (e.g., plays back) the video file ("clip1.mp4") to the user device 210. Thus, the CPS 215 controls the video call when the call is placed on hold, and facilitates the presentation of video content to the user device 210 during the hold event of the video call.

Once the hold is ended, the service center 220 resumes control of the call (e.g., the call is referred back to the service center 220), using similar SIP based messaging flows. For example, the service center 220 can re-establish the RTP session 245, or a similar RTP session, when resuming the video call.

Thus, in some embodiments, the systems and methods leverage various SIP messaging protocols and specifications in order to implement the enhanced video calling techniques described herein. Various modules and/or components can assist in implementing the video calling techniques. The modules can be functional modules or engines that are implemented with a combination of software (e.g., executable instructions, or computer code) and hardware (e.g., at least a memory and processor). Accordingly, as used herein, in some examples a module or engine is a processor-implemented module or set of code and represents a computing device having a processor that is at least temporarily configured and/or programmed by executable instructions stored in memory to perform one or more of the particular functions that are described herein.

For example, a system that provides a session internet protocol (SIP) service for handling video calls managed by a telecommunications network can include a call park module that manages a video call established between a first device and a second device and transferred from the second device to a call park server when the video call is placed on hold by the second device. The call park module can receive a SIP REFER message from the second device when the video call is placed on hold, and send a SIP 202 ACCEPT message to the second device to accept the video call.

Further, the system can include a content selection module that selects a content item to present to the first device during the hold placed on the video call by the second device, where the content item is presented to the first device via the call park server. The content selection module can send a SIP INFO message to a content server to request the content server to provide a content item to present to the first device, where the SIP INFO message includes information in a body of the message that includes parameters for a type of content item to present to the first device, and receive from the content server the request content item (e.g., via another SIP INFO message).

In addition to the call flows (or, in collaboration with the call flows), the systems and methods provide various types of content items when video calls are placed on hold or otherwise parked (e.g., transferred or referred to the CPS 215). FIG. 3 is a flow diagram illustrating a method 300 for presenting content to a user device when a video call is placed on hold. The method 300 can be performed by the user device 110, the video call service 135, the video content server 140, or the components depicted in FIG. 2, and, accordingly, is described herein merely by way of reference thereto. It will be appreciated that the method 300 can be performed on any suitable hardware.

In operation 310, the method 300 establishes a video call between a user device and a video communication service, where the video communication service is part of a customer service center that handles customer service inquiries from customers of an entity. For example, the user device 110 can initiate a video call to the video communication service 135, receive an acceptance of the video call from the service 135, and acknowledge the acceptance, establishing a video call or chat over an RTP session.

In operation 320, the method 300 receives an indication that the video call has been placed on hold by the video communication service. For example, a representative associated with the customer service entity 130 can place the video call on hold or otherwise provide input to transfer, or refer, the call to another entity or endpoint.

In operation 330, the method 300 transfers control of the video call from the video communication service to a call park server. For example, the video communication service 135 can send a message to the call park server (e.g., CPS 215) that the service 135 is referring the call for control and/or handling by the call park server.

In operation 340, the method 300 retrieves, at the call park server, a video clip to present to the user device while the video is on hold. For example, the call park server can retrieve, from the video content server 140, one or more content items, such as video clips, from the server 140.

As described herein, the method 300 can utilize context information associated with a video call, and select one or more content items to present during the video call when the call is placed on hold. FIG. 4 is a flow diagram 400 illustrating a method for selecting content to be presented during a video call hold event. The method 400 can be performed by the user device 110, the video call service 135, the video content server 140, or the components depicted in FIG. 2, and, accordingly, is described herein merely by way of reference thereto. It will be appreciated that the method 400 can be performed on any suitable hardware.

In operation 410, the method 400 receives a request to provide a video clip to insert into a video call when the video call is placed on hold. In operation 420, the method 400 identifies a context associated with the video call, and, in operation 430, the method 400 selects a video clip to provide based on the identified context. For example, the call park server 215 can send a SIP INFO message to the content server 230 that identifies parameters associated with a video clip to be retrieved from the server 230, and the server 230 selects one or more video clips that satisfy the identified parameters.

Example Context-Based Selections of Video Clips and Other Content Include:

Context information that identifies a geographical location that includes the user device 110, where the server 230 selects a video clip based on a geographical location of the user device (e.g., one or more clips associated with products or services local to the user device, such as restaurants, retail stores, entertainment venues, local service providers, and so on);

Context information that identifies a device type for the user device 110, where the server 230 selects a content item based on the device type for the user device (e.g., one or more content items that can be presented by the user device and its associated clients or applications);

Context information that identifies a user profile or other user information for a user associated with the user device 110, where the server 230 selects a content item based on the user profile (e.g., one or more content items targeted to the user or a group of users sharing common characteristics with the user);

Context information that identifies a predicted duration for the hold event associated with the video call (e.g., how long the call is predicted to be on hold), where the server 230 selects a content item based on the predicted duration (e.g., one or more content items having a known duration similar to the predicted duration for the call being placed on hold); and so on.

Returning back to FIG. 3, the method 300, in operation 350, presents the video clip to the user device via the call park server while the call park server controls the video call with the user device. For example, the call park server establishes an RTP session with the user device 110 when the video call is on hold, and presents the video clip via the established RTP session. As described herein, the video clip can include a sponsored message, advertisement, information representing products or services provided by the entity associated with the customer service center, entertainment, multimedia content, interactive content, and so on.

As described herein, the method 300 can then follow similar processes and/or call flows when returning video calls to their original handling device or entity (e.g., back to the video communication service 135 of the entity 130). However, unlike other types of communication (e.g., voice calls) where a voice call can easily be transferred back and forth without disrupting a user's experience, the systems and methods can refer back video calls when certain threshold conditions are met, such as conditions where a video clip or other content item is completed or at a suitable breaking or end point.

Thus, in some embodiments, the systems and methods can determine the video communication service 135 has ended the hold placed to the video call, identify a remaining duration to complete presentation of the video clip to the user device, and when the remaining duration is below a threshold duration (e.g., is less than completion of the clip), complete the presentation of the video clip before returning control of the video clip to the video communication service. However, when the remaining duration is above a threshold duration (e.g., is less than halfway), the systems and methods can end the presentation of the video clip before completing the presentation of the video clip and return control of the video clip to the video communication service.

Similarly, the systems and methods can determine a user associated with the user device has interacted with the video clip (e.g., is actively watching the video clip, has paused or re-watched the clip, has provided input in response to prompts presented by the video clip, and so on), and return control of the video clip to the video communication service upon determining that the user has completed an interaction with the video clip (e.g., the user has not interacted with the clip for a certain period of time).

Thus, in some embodiments, the systems and methods can enhance the experiences and interactions for users that communicate with customer service centers and other entities over video calls and/or video chats, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for presenting content to a user device during a video call, the method comprising:
   establishing a video call between a user device and a video communication service,
      wherein the video communication service is part of a customer service center that handles customer service inquiries from customers of an entity;
   receiving an indication that the video call has been placed on hold by the video communication service;
   transferring control of the video call from the video communication service to a call park server;
   retrieving, at the call park server, a video clip to present to the user device while the video call is on hold;
   presenting the video clip to the user device via the call park server while the call park server controls the video call with the user device;
   determining that the video communication service has ended the hold placed on the video call;
   identifying a remaining duration to complete presentation of the video clip to the user device;
   when the remaining duration is below a threshold duration, completing the presentation of the video clip before returning control of the video clip to the video communication service; and
   when the remaining duration is above a second threshold duration, ending the presentation of the video clip before completing the presentation of the video clip and returning control of the video clip to the video communication service.

2. The method of claim 1, further comprising:
   determining a user associated with the user device has interacted with the video clip; and
   returning control of the video clip to the video communication service upon determining that the user has completed an interaction with the video clip.

3. The method of claim 1, wherein retrieving a video clip to present to the user device while the video call is on hold includes:
   identifying a context associated with the video call between the user device and the video communication service; and
   selecting a video clip to be presented to the user device that is based on the identified context associated with the video call.

4. The method of claim 1, wherein retrieving a video clip to present to the user device while the video call is on hold includes:
   identifying a geographical location that includes the user device; and
   selecting a video clip to be presented to the user device that is based on the geographical location of the user device.

5. The method of claim 1, wherein retrieving a video clip to present to the user device while the video call is on hold includes:
   identifying a device type for the user device; and
   selecting a video clip to be presented to the user device that is based on the device type for the user device.

6. The method of claim 1, wherein retrieving a video clip to present to the user device while the video call is on hold includes retrieving a video clip that presents a sponsored message to the user device.

7. The method of claim 1, wherein retrieving a video clip to present to the user device while the video call is on hold includes retrieving a video clip that presents information for products or services provided by the entity associated with the customer service center.

8. The method of claim 1, wherein the video clip includes a sponsored message for products or services provided by an entity associated with the customer service center.

9. The method of claim 1, wherein the video clip includes interactive content presented to a user of the user device via a user interface of the user device, and wherein the video clip is retrieved from a video content server not associated with an entity providing the customer service center.

10. A non-transitory computer-readable medium whose contents, when executed by a computing system associated with a telecommunications network, causes the computing system to perform a method, the method comprising:
- receiving an indication that a video call between a user device and a video communication service has been placed on hold by the video communication service;
- transferring control of the video call from the video communication service to a call park server;
- retrieving, at the call park server, content to present to the user device while the video call is on hold;
- presenting the content to the user device via the call park server while the call park server controls the video call with the user device;
- determining that the video communication service has ended the hold placed on the video call;
- identifying a remaining duration to complete presentation of the video clip to the user device;
- when the remaining duration is below a threshold duration, completing the presentation of the video clip before returning control of the video clip to the video communication service; and
- when the remaining duration is above a second threshold duration, ending the presentation of the video clip before completing the presentation of the video clip and returning control of the video clip to the video communication service.

11. The non-transitory computer-readable medium of claim 10, wherein the content to present to the user device includes multimedia content presented to a user of the user device via a user interface of the user device.

12. The non-transitory computer-readable medium of claim 10, wherein the content to present to the user device includes interactive content presented to a user of the user device via a user interface of the user device.

13. The non-transitory computer-readable medium of claim 10, wherein the content to present to the user device is retrieved from a video content server not associated with an entity providing the customer service center.

14. The non-transitory computer-readable medium of claim 10, wherein the content to present to the user device is selected, in part, based on a user profile for a user associated with the user device.

15. The non-transitory computer-readable medium of claim 10, wherein the content to present to the user device is selected, in part, based on a location of the user device.

16. The non-transitory computer-readable medium of claim 10, wherein the content to present to the user device is selected, in part, based on a predicted duration of the hold placed on the video call by the video communication service.

17. The non-transitory computer-readable medium of claim 10, wherein the content to present to the user device includes a sponsored message for products or services provided by an entity associated with the customer service center.

18. A system that provides a session internet protocol (SIP) service for handling video calls managed by a telecommunications network, the system comprising:
- a memory; and
- a processor in communication with the memory, the processor operable to execute software modules, the software modules comprising:
  - a call park module that manages a video call that has been established between a first device and a second device and transferred from the second device to a call park server when the video call is placed on hold by the second device,
    - wherein the video call is received via the SIP service; and
  - a content selection module that selects a content item to present to the first device during the hold placed on the video call by the second device,
    - wherein the content item is presented to the first device via the call park server,
  - wherein the call park module:
    - receives an indication that the video communication service has ended the hold placed on the video call,
    - determines a user associated with the user device has interacted with the video clip, and
    - returns control of the video clip to the video communication service upon determining that the user has completed an interaction with the video clip.

19. The system of claim 18, wherein the telecommunications network includes a wireless cellular communications network, wherein the first device is a mobile phone, and wherein the call park module:
- receives a SIP REFER message from the second device when the video call is placed on hold; and
- sends a SIP 202 ACCEPT message to the second device to accept the video call.

20. The system of claim 18, wherein the content selection module:
- sends a SIP INFO message to a content server to request the content server to provide a content item to present to the first device,
  - wherein the SIP INFO message includes information in a body of the message that includes parameters for a type of content item to present to the first device; and
- receives from the content server the requested content item.

* * * * *